Nov. 4, 1969

J. L. ROBERTSON ET AL 3,476,822

SEPARATION PROCESS

Filed July 28, 1964

Jerry L. Robertson
William R. Epperly

Inventors

By Perry Carvellas

Patent Attorney

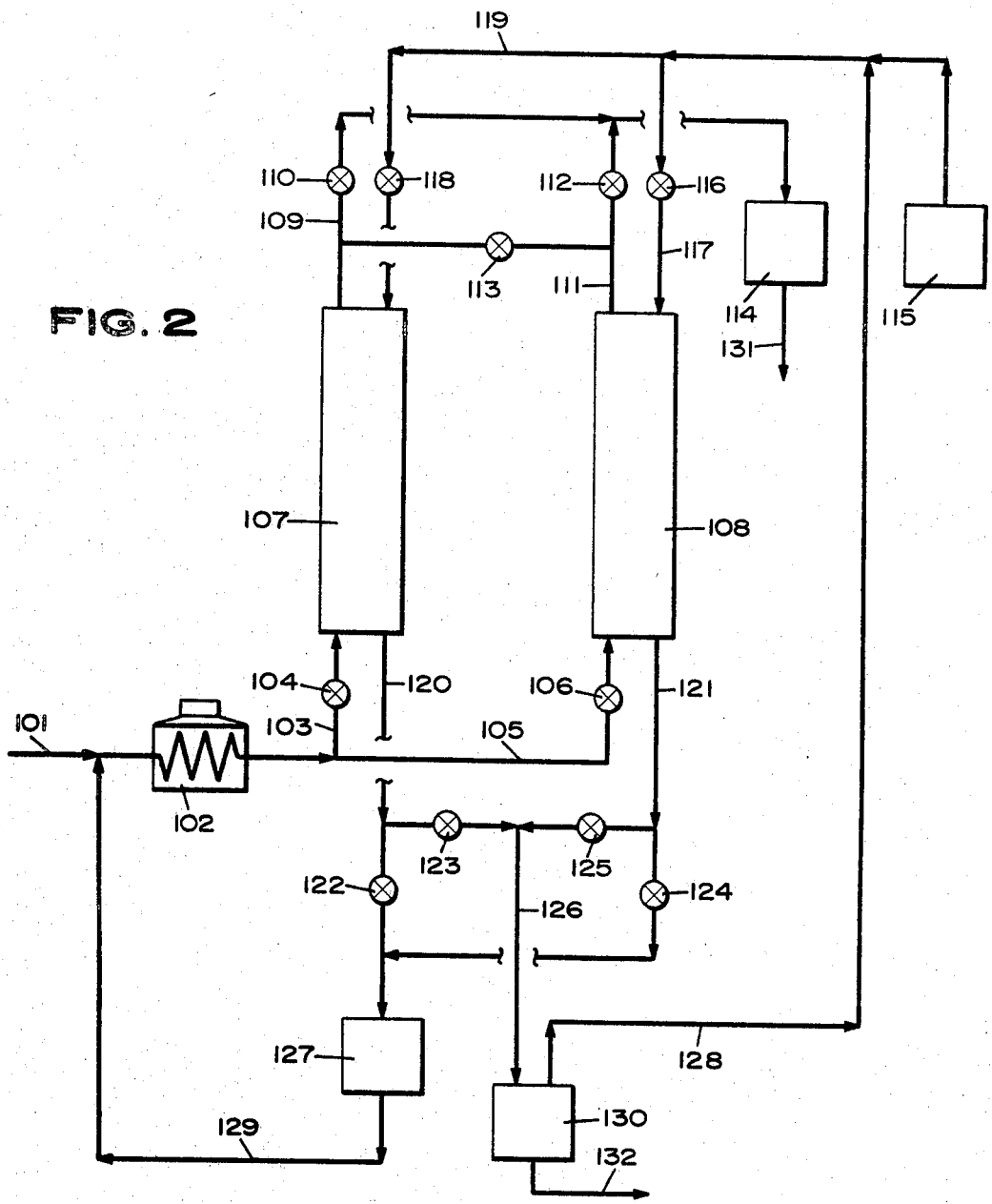

Jerry L. Robertson
William R. Epperly  Inventors

By Perry Carvellas
Patent Attorney

United States Patent Office 3,476,822
Patented Nov. 4, 1969

3,476,822
SEPARATION PROCESS
Jerry L. Robertson, Millburn, and William R. Epperly, New Providence, N.J., assignors to Esso Research and Engineering Company, a corporation of Delaware
Filed July 28, 1964, Ser. No. 385,731
Int. Cl. C07c 7/12
U.S. Cl. 260—674          16 Claims

ABSTRACT OF THE DISCLOSURE

An adsorption process comprising two adsorption and two desorption steps. In the first adsorption step, high purity product is obtained. In the second adsorption step, product of a lower purity is obtained. The product from the second step is preferably used to displace the displacing agent. In the first desorption step, a displacing agent is used to displace the adsorbed material. In the second desorption step, solvent or the product from the second adsorption step is used to displace the displacing agent from the adsorption bed. Maximum displacing agent efficiency is obtained by using one "bed load" of displacing agent in the first desorption step.

---

This invention relates to separation processes utilizing at least one adsorbent bed wherein materials adsorbed within said adsorbent bed or beds are desorbed with a displacing agent. In particular, it relates to a process of separating various components utilizing one or more fixed beds or a noncyclical process involving moving adsorbent beds wherein the material on the adsorbent beds is desorbed by means of a displacing agent. The displacing agent is used to maximum efficiency and minimum difficulties are encountered when separating the desired product from displacing agent.

There are many processes known where separation of various materials are accomplished by using adsorbents. The major classes of such adsorbents commercially available comprise aluminum oxide (alumina), activated carbon, silica gels, clays and crystalline zeolites. They are so-well known as not to warrant further description. It has repeatedly been disclosed that some adsorbents, such as molecular sieves, can be conveniently desorbed by the use of gaseous displacing agents.

In typical processes which utilize adsorbents and displacing agents, the displacing agent is allowed to break through the adsorbent with the desorbed material unless trimer beds are used. Subsequently, the displacing agent and desorbate had to be separated from each other in order to remove the displacing agent for reuse as well as to recover the desorbed material which can be, in some instances, desired product. Furthermore, the displacing agent had to be recirculated by expensive mechanical means such as compressors.

Previously, it has been shown that extremely effective and economic separations utilizing adsorbent beds can be accomplished by preventing breakthrough of the displacing agent with the desorbed material. In essence, desorption is stopped at a point just prior to displacing agent breakthrough. Normally, on the desorption portion of a fixed bed cycle, some displacing agent leaks from the bed initially at a slow rate. At breakthrough this rate is subject to a sharp increase.

For purposes of this application, it will be most convenient to describe the adsorption-desorption system in terms of a solvent, a solute and a displacing gas. The solvent or effluent is the material in the feed which is least strongly adsorbed. This is to be contrasted with the solute or adsorbable component which is the element in the feed which is most strongly adsorbed. The displacing gas is also adsorbed but is readily desorbable by the solvent. This process is adaptable for use with both the A series of sieves as exemplified by 5A molecular sieves which are used for separating normal hydrocarbons from nonnormal hydrocarbons and the X series of sieves as exemplified by the 13X sieve which may be utilized to separate aromatic and other polar compounds from paraffinic and naphthenic components in a hydrocarbon feed as well as other adsorbents. Thus, by way of example, in the 13X situation, the solute corresponds to the aromatic and other polar compounds, and the solvent or adsorbable component corresponds to paraffinic and naphthenic components which would be found within a hydrocarbon feed. The preferred displacing agent in this instance is ammonia. However, a variety of other compounds may be utilized and they will be discussed subsequently at length.

This process operates in two adsorption and two desorption steps. In the initial adsorption step, feed consisting of solvent and solute to be separated is introduced into a bed which has been previously desorbed with the displacing agent. The displacing agent was subsequently pushed off of the bed by solvent containing a reduced quantity of solute relative to feed. Thus, prior to adsorption, the bed had been depleted in displacing gas and contains adsorbed solvent with possibly some solute. When feed is introduced to this bed, solvent is displaced almost immediately and appears at the exit of the bed. Feed is continuously passed to the bed in steps 1 and 2 until the desired degree of saturation of solute has been attained as evidenced by the appearance of a predetermined amount of solute in the bed effluent. This amount may be between parts per million solute and feed composition. The solvent and solute effluent is collected as a product in step 1. In adsorption step 2, the effluent from the bed on adsorption may be sent to the bed on desorption in the same direction as the displacing gas had been flowing on that bed during desorption. In the case of single bed operation this material is collected to be used in desorption step 2 described below.

Desorption step 1 begins by introducing displacing gas that may contain some unremoved solvent and solute of a bed that has completed adsorption steps 1 and 2 as described above. Material of about feed composition appears at the exit almost immediately. There is then an intermediate period in which the effluent may have a solute concentration equal or less than in the feed. Finally, the solute concentration begins to increase as it is pushed out of the bed by the displacing agent. This rise may appear before or after the appearance of the displacing agent at the exit of the bed. The end of desorption step 1 is distinguished by the appearance of displacing gas at the exit of the bed. In practice, a small amount of displacing agent may break through the bed. Preferably, less than 6% of the displacing agent fed during desorption step 1 is allowed to leave the bed during this step. Even more preferably, less than 4% is allowed to leave and most preferably, less than 2% is allowed to leave the bed during desorption step 1.

Desorption step 2 may begin by introducing the solute lean effluent from the bed now on adsorption step 2 into the bed on desorption in the same direction of flow as the displacing gas during desorption step 1. Cocurrent flow of displacing agent and solute effluent is essential. If this is not accomplished, maximum efficiency will not be obtained from the displacing agent. Utilizing the cocurrent flow in actuality is the equivalent of having two beds of displacing agent, since in this manner, the entire displacing agent present is contacted with the adsorbent bed.

In the case of a single bed, the material fed during desorption step 2 may be taken from the bed at any time during adsorption. Thus, the allowable solute concentration in this material may be anywhere between 0 and feed composition. In general, the solute concentration in the effluent rises during adsorption. However, for one bed operation, the concentration of solute in solvent feed during desorption step 2 is constant since it is collected and held in intermediate storage.

During desorption step 2, for single, multiple or moving beds, the effluent contains displacing agent, solute and possibly some solvent. The solute is the desired desorption product and it and the solvent impurities are removed from displacing agent by chemical or physical means. The physical means usually involve condensation. Chemical means could involve reacting the displacing agent with a reagent. For example, with $NH_3$, the displacing agent could be removed by reacting with an acid. Recovery of the $NH_3$ from the acid salt would then be necessary.

Desorption step 2 ends with 70–100% of the displacing agent removable by the solvent has been pushed off the bed. This is defined as a "bed load" of displacing agent. Any displacing agent that remains on the bed at this time may appear in the solvent-rich stream during a subsequent adsorption. Provisions for makeup displacement agent must, therefore, be included to compensate for this loss. A small amount of solvent may break through the bed toward the end of desorption step 2. Preferably, less than 12% of the material fed during this step is allowed to leave the bed. Even more preferably, less than 6% is allowed to leave the bed and most preferably, less than 2% is allowed to break out of the bed during desorption step 2. Solute purity requirements determine how much solvent is allowed to break through the bed.

Several significant advantages are to be gained by utilizing the process of the instant invention. Primarily, the effective average amount of displacing agent available for desorption in this process is maximized. This is accomplished by pushing the displacing agent off the bed with the solvent-rich stream and, consequently, passing the entire amount of displacing agent to be used through the entire adsorption bed. One adsorption-desorption cycle has been envisioned in which the displacing agent is fed to the bed on desorption to incipient breakthrough. In this cycle the top of the bed is contacted by one "bed load" of displacing agent, but the bottom of the bed is contacted by very little. In the cycle of this invention the bottom of the bed is contacted and thus desorbed by one "bed load" of displacing agent resulting in a great increase in desorption efficiency. This efficiency is obtained without the use of an expensive displacing agent recirculator since the energy required to move the displacing agent out of the bed is supplied by the liquid feed pump prior to feed vaporization during step 2. Also, the small amount of displacing agent used in this cycle eliminates the need for a displacing agent heater. The heat from the feed is transferred to the adsorbent bed and subsequently to the displacing agent prior to its entry into the desorbing zone.

Additionally, the displacing agent appears in the solute-rich stream as opposed to the solvent-rich stream as would occur if the displacing agent were not pushed off of the bed in desorption step 2. This makes the cycle easily applicable to the moving bed type of operation. Furthermore, the solvent appears immediately in the outlet of the bed on adsorption. This steady flow and absence of displacing agent from the 5A sieve sharply. However, even in ent efficient. In addition, it also makes it possible to use the solvent-rich stream as a hot vapor feed to another process without contamination and/or dilution with displacing agent.

In the preferred embodiment, this process is operated with a solvent which is capable of displacing the displacing agent. This is not possible, for example, in the 5A sieve system because here the solvent, which may be isoparaffins, naphthenes and aromatics, will not displace the displacing agent from the °A sieve sharply. However, even in this system, displacing agent is desorbed and passes out the bottom of the bed effecting further desorption of solute.

By displacing agent is meant a polar material or a material with substantial polarizability compared with normal hydrocarbons, aromatics, sulfur compounds, and olefins. It is intended that the terms "displacing medium" and "displacing agent" have the same meaning.

A preferred displacing agent has the general formula:

$$N\begin{matrix} \diagup R_1 \\ -R_2 \\ \diagdown R_3 \end{matrix}$$

wherein $R_1$, $R_2$ and $R_3$ are selected from the group consisting of hydrogen and $C_1$–$C_5$ alkyl radicals. Thus, preferred displacing agents include $NH_3$ and $C_1$–$C_5$ primary, secondarly, and tertiary amines with $NH_3$ being most preferred and the $C_1$–$C_5$ primary amines being next in order of preference. Other suitable desorbing mediums include CO, NO, $SO_2$, $CO_2$, $C_1$–$C_5$ alcohols, glycols, halogenated compounds such as methyl and ethyl chloride and methyl fluoride and nitrated compounds such as nitromethane. Generally, any compound that has at least one polar bond of a great polarizability potential compared with the material to be desorbed, which can enter the molecular sieve, which has a heat of adsorption that is substantial compared with the material to be desorbed and which is preferentially adsorbed under the desorption conditions described herein, can be used as a displacing agent. These displacing agents are preferably used in their gaseous state.

Table I which follows summarizes the operating, preferred and especially preferred conditions of the process of the invention including single beds, multiple-fixed bed and moving bed aspects.

TABLE I

| Adsorption [1] | Operating | Preferred | Especially Preferred |
|---|---|---|---|
| Temperature, °F | 70 to 900 | 400 to 750 | 500 to 700. |
| Pressure, p.s.i.a | 0.5 to 500 | 1 to 50 | 5 to 40. |
| Total Average Feed Rate, w./w., hr | 0.01 to 10 | 0.1 to 5 | 0.2 to 1. |
| Feed/cycle | 0.001 to 5 | 0.01 to 0.5 | 0.0 to 0.3. |
| Feed | $C_2$ to $C_{35}$ | $C_3$ to $C_{25}$ | $C_4$ to $C_{10}$. |
| Solute in feed, percent | 0.0001 to 50 | 0.001 to 35 | 0.1 to 25. |
| Desorption: | | | |
|   Temperature, °F | 70 to 900 | 400 to 750 | 500 to 700. |
|   Pressure, p.s.i.a | 0.5 to 500 | 1 to 50 | 1 to 40. |
| Displacing Agent [2] |  | $NH_2R_1$ | $NH_3$. |
| Displacing Agent Rate, w./w./hr.[3] | 0.001 to 5 | 0.1 to 1 | 0.02 to 2. |
| Displacing Agent, w./w./cycle [4] | 0.0001 to 0.3 | 0.001 to 0.1 | 0.002 to 0.05. |
| Solute Lean Feed, w./w., cycle [5] | 0.0005 to 2 | 0.005 to 0.2 | 0.01 to 0.2. |

[1] Adsorbents that may be used include zeolitic molecular sieves such as Type A and Type X (e.g., 5A, 10X and 13X with X types preferred), silica gels, aluminas, charcoals, magnesia and clays.
[2] $R_1$, $R_2$, $R_3$ may be H or $C_1$–$C_5$ alkyl groups.
[3] Instantaneous rate during desorption step 1.
[4] Amount fed during step 1.
[5] Amount fed during step 2.

Although the description is considered adequate and the invention can be fully understood by reference to the preceding description and the appended claims, the further description that follows is presented for the purpose of a more detailed and complete explanation.

For the purposes of the following more detailed and complete portion of the specification:

FIGURE 2 is a schematic diagram of a preferred embodiment of a two-fixed bed system utilizing the present invention.

Figures 1, 4:
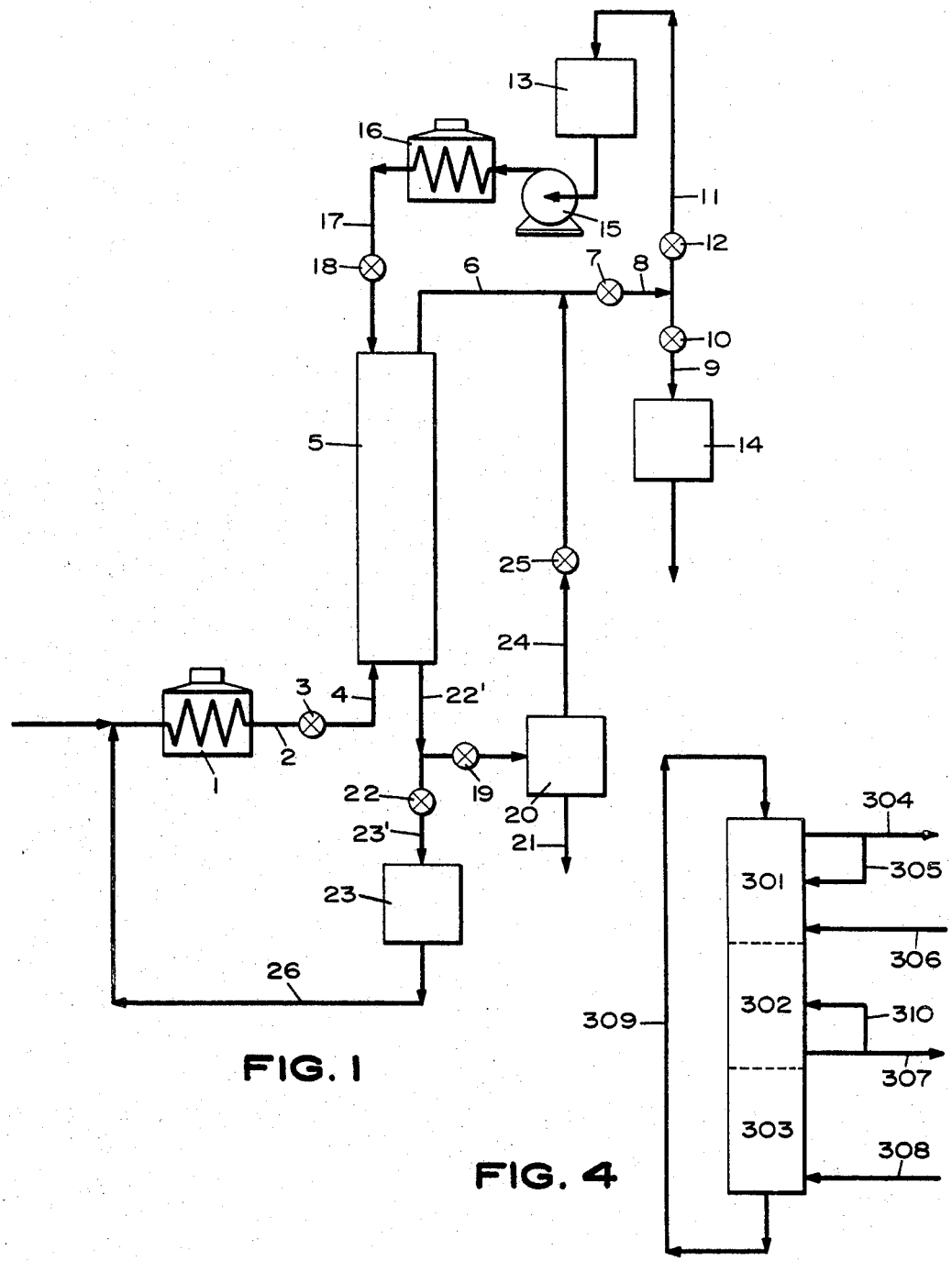
FIGURE 1 is a schematic diagram of a preferred single fixed bed process of the invention.
FIGURE 4 is a schematic diagram of a preferred embodiment of a moving bed embodiment of the instant invention.

Referring now to FIGURE 1, feed is heated in furnace 1, passed through line 2 into sieve bed 5 through valve 3 and line 4. The bed contains 10X molecular sieve and the feed comprises hexane and benzene. The solvents, or less strongly adsorbed material, appear almost immediately in line 6, as adsorption effluent, which in this case is hexane, after passing through sieve bed 5. The solute, which in this case is benzene, is adsorbed on the packed bed 5. Feed continues to flow through line 4 until the solute concentration in line 6 is equal to some predetermined amount less than in the feed; in this case it may be 0.0 to 8 wt. percent. At this time there is no flow through valves 18 and 25. The solvent which is removed through line 6 is taken off in two separate cuts. The first cut which is low in solute product, in fact, contains about 0.005 to 2 wt. percent, is passed through valve 7, line 8, line 9 and valve 10 and 15 collected in vessel 14. Subsequently, valve 10 is closed and solvent passes through valve 7, line 8, line 11 and valve 12 into container 13 when the second cut of solvent-rich material is stored.

The desorption process is then carried out in two steps. In step 1, a displacing agent, which in this case is ammonia, is passed from vessel 20 through line 24. Valve 25 is open and the ammonia then enters line 6 and passes into the sieve bed 5. Valve 7 is closed. A solute-rich stream passes out essentially immediately through line 22', 23' and valve 22. The first product that appears in vessel 23 is about feed composition and, therefore, may be recycled to feed through line 26. This is a preferred method but is optional. The amount of ammonia used is predetermined to be less than the amount required to allow breakthrough of the desorbing agent into vessel 23. This may be readily determined by one skilled in the art and need not be discussed here. Step 1 is completed when this amount of displacing agent, which is ammonia, has been fed through valve 25.

Step 2 begins when solvent which may or may not contain solute is removed from vessel 13, passes through pump 15, furnace 16 (which may be at the some temperature as furnace 1) into line 17 and from there enters zone 5 through valve 18. The amount of solvent used is predetermined to be less than required to allow appearance of the solvent through valve 19. In this manner, the solute is displaced from the bed into line 22', from whence it passes through valve 19 into vessel 20 which is maintained at a pressure high enough to force the ammonia into bed 5 during the subsequent desorption step 2. Thus, effective use of two "bed loads" of ammonia is realized without the need for a compressor for desorption. Solute-rich product is withdrawn from vessel 20 through line 21.

Preferred configuration for continuous commercial operation of this cycle contains two beds. One bed is on adsorption while the other is on desorption. This will allow for more continual flow in the system. The particular preferred embodiment is illustrated by FIGURE 2. The system contains one bed which is on adsorption while the other is on desorption. Thus, turning to FIGURE 2, bed 107 is on adsorption and bed 108 is on desorption. Feed containing both solvent and solute is pumped through line 101 and passed to heater 102. The adsorbent bed 107 contains 10X molecular sieve. The feed in this case is hexane and benzene. Within the heater 102 the feed is raised in temperature of 500° to 700° F. Feed is removed from the heater 102 through line 103 and passes through valve 104 into bed 107. Valve 106 is closed. The solute in this case is benzene and it is adsorbed almost immediately into bed 107 leaving a solvent-rich effluent, which is composed of hexane and the solvent-rich effluent exits almost immediately through line 109 and valve 110 and from there enters vessel 114. At a given time, the valve 110 is closed to flow to vessel 114 and the solvent passes through valve 113 to bed 108. This marks the start of the second phase of the adsorption cycle for bed 107 and the start of the second phase of the desorption cycle for bed 108. Thus, a solvent-rich stream of any composition between pure solvent and solvent plus solute in feed composition in introduced into bed 108. The composition of this stream will depend upon the length of time for a fixed feed rate after the start of adsorption that the second adsorption step is started. If it is started after only a very short adsorption step 1, the composition at valve 113 will be almost pure solvent. If it is started after a very long adsorption step 1, the composition at valve 113 will be about the same as feed.

The length of adsorption step 2 is determined by the feed rate and the amount of material required to push the displacing agent from bed 108. The critical quantity is the amount of material required to push the displacing agent from the bed. The product of the adsorption time and the feed rate must equal this quantity. The amount of material required may be between 0.01 and 0.2 w./w. adsorbent.

Desorption begins when displacing agent, ammonia in this case, which has been stored at a high enough pressure in vessel 115 to push it through the bed, is passed to bed 108. At about the same time that adsorption begins on bed 107, ammonia is introduced to bed 108 through line 119 and 116 and line 117. The flow rate of the displacing agent is regulated so it will not break through into line 121 through valve 124 and into vessel 127 at a time prior to the end of step 1. The displaced material may be recycled to feed through line 129. Valve is closed during step 1. The effluent in line 121 is essentially all solute and solvent and becomes richer in solute toward the end of step 1. At or before the beginning of step 2, valve 124 is closed and valve 125 is opened so that the flow is diverted to line 126 and vessel 130. The solvent-rich stream from an adsorption step on bed 107 pushes the displacing agent in solute off bed 108 through valve 113. Thus, during the second step, the effluent from the bed on adsorption is fed directly to the bed on desorption. When desorption step 2 is completed in bed 108 and adsorption step 2 completed in bed 107, the flow is switched. Table II shows the positions of the valves during each step of the cycle.

TABLE II

| Valve # Step | Bed 107 | | | | | Step | Bed 108 | | | | | Common 113 |
| --- | --- | --- | --- | --- | --- | --- | --- | --- | --- | --- | --- | --- |
| | 104 | 110 | 118 | 122 | 123 | | 106 | 112 | 116 | 124 | 125 | |
| Adsorption 1 | +[1] | + | − | − | − | Desorption 1 | − | − | + | ±[2] | ∓ | − |
| Adsorption 2 | + | − | − | − | − | Desorption 2 | − | − | − | − | + | + |
| Desorption 1 | − | − | + | ±[2] | ∓ | Adsorption 1 | + | + | − | − | − | − |
| Desorption 2 | − | − | − | − | + | Adsorption 2 | + | − | − | − | − | + |

[1] + Means valve open. − Means valve closed.

[2] Valve (124) may be closed and (125) opened at any time during step 1 depending on amount of recycle desired.

The pressure in the feed system is maintained high enough so that the displacing gas may be pushed from the second bed and stored in vessel 115. The absolute storage pressure must be higher than in the outlet of bed 108 which is line 121 during desorption step 1 to eliminate the need for displacing agent recirculator. A steam jet may be used (not shown) on the bed outlet to create a partial vacuum on the bed in vessel 127. In this case, displacing agent could be stored in an atmospheric surge in vessel 115.

Desorption effluent in line 132 from vessel 130 during step 2 is rich in solute and contains displacing agent. These are separated. The displacing agent is sent to storage in vessel 115 through line 128 and solute-rich stream and solvent-rich stream are recovered through lines 132, and 131 respectively.

Extension of the cycle to a multibed system will be obvious to those skilled in the cyclic systems. A three-bed system will be described here for conciseness with the understanding the system may be extended to as many beds as desirable by repetition of the intermediate beds.

Figure 3:
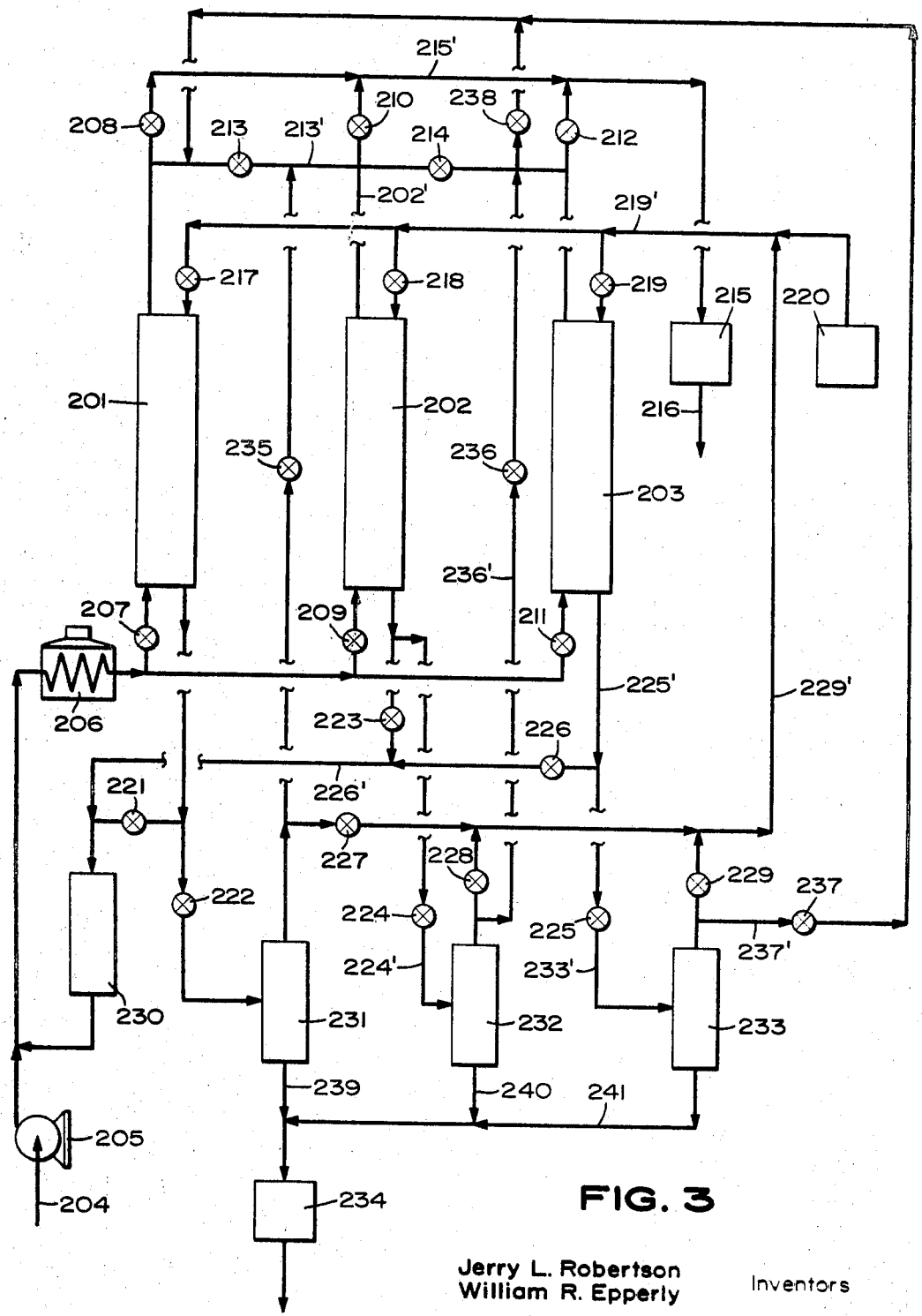
FIGURE 3 is a schematic diagram of a three bed example of a multibed system utilizing the process of the instant invention.

The system shown in FIGURE 3 is basically the same as the two fixed bed case except that the solute-rich displacing gas from desorption step 2 is separated and the displacing gas is sent to the third bed. This sequence is repeated for an $n$-bed system up to the $n$th bed. A system such as this has the advantage of obtaining $n$ "bed loads" of displacing agent with no compressor, that is to say, as many bed loads of $NH_3$ as there are beds. All of the energy is supplied by the feed pump 205.

In the preferred configuration, bed 201 is on adsorption step 1 while bed 203, or the last bed in this series, is on desorption step 1. There is no flow to or from bed 202 or intermediate beds during step 1. Feed consisting of benzene and hexane in this case enters bed 201 through furnace 206 and valve 207. Almost immediately, solute lean effluent appears at valve 208 to be transferred to vessel 215 through line 215'. Valves 213 and 217 are closed. At the end of adsorption step 1 as previously defined, valve 208 is closed and valve 213 is opened transferring solute lean effluent to bed 202 through line 213'.

Valves 210 and 214 are closed. Flow continues through valve 207 during adsorption step 2. While bed 201 is on adsorption step 1, bed 203, or the last in the series, is on desorption step 1. Bed 203 was previously on adsorption step 2. To accomplish this, displacing agent, which in this case was ammonia, passes from vessel 220 through valve 219 through line 219' and displaces the solvent and solute, which are hexane and benzene, respectively in this case, through valve 226, line 226' and then into vessel 230. Valve 225 and 211 are closed during this step. Desorption step 2 begins in bed 202 at the same time that adsorption step 2 starts in bed 201. When valve 213 is opened solute lean effluent is fed to bed 202 through line 213' and line 202' to push off the displacing agent when bed 202 has just completed a desorption 2 step and therefore is loaded with displacing agent. Displacing agent plus a solute-rich stream passes out of bed 202 through line 224'. Line 224' has a valve 224 which in this case, of course, is open. Finally, the displacing agent and solute-rich stream pass into separator 232. Here the displacing agent is separated from the solute-rich stream and is sent through line 236' and open valve 236 into bed 203. Valves 228, 214, 212 and 219 are closed. This displacing agent then pushes off the displacing agent previously fed to bed 203 in desorption step 1 and some remaining solute. The mixture of displacing agent and remaining solute passes out through line 225' and then through valve 225 which is opened. Valve 226 is closed at this time. The mixture then passes through line 226' and into separator 233. The solute-rich stream is separated from the displacing agent in separator 233 and the displacing agent is sent to storage in vessel 220 through valve 229 and line 229'. Desorbate is transferred to vat 234 through lines 239, 240 and 241. This completes the cycle. The beds are then switched with bed 1 becoming bed 3, bed 3 becoming bed 2 and bed 2 becoming bed 1. This can be done with the available valves as shown in Table III.

As shown in FIGURE 3, it is possible to recycle the first material obtained in desorption step 1 back to feed. This is desirable to maximize the separation efficiency.

Table III illustrates the position of the various valves of FIGURE 3 during the sequences.

TABLE III.—VALVE POSITIONS DURING SEQUENCE

| | Valve | Ads. 1 | Ads. 2 | Des. 1 | Des. 2 | Not in use | Des. 2 |
| --- | --- | --- | --- | --- | --- | --- | --- |
| Bed 1 | 207 | + | + | − | − | − | − |
| | 208 | + | − | − | − | − | − |
| | 217 | − | − | + | − | − | − |
| | 221 | − | − | ∓[1] | − | − | − |
| | 222 | − | − | ∓[1] | + | − | + |
| | 227 | − | − | ∓[1] | + | − | − |
| Common | 213 | − | + | − | − | − | − |
| | 235 | − | − | − | − | − | + |

| | Valve | Not in use | Des. 2 | Ads. 1 | Ads. 2 | Des. 1 | Des. 2 |
| --- | --- | --- | --- | --- | --- | --- | --- |
| Bed 2 | 209 | − | − | + | + | − | − |
| | 210 | − | − | + | − | − | − |
| | 218 | − | − | − | − | + | − |
| | 223 | − | − | − | − | ∓[1] | − |
| | 224 | − | + | − | − | ∓[1] | + |
| | 228 | − | − | − | − | ∓[1] | + |
| Common | 214 | − | − | − | + | − | − |
| | 236 | − | + | − | − | − | − |

TABLE III—Continued

|  | Valve | Des. 1 | Des. 2 | Not in use | Des. 2 | Ads. 2 | Ads. 2 |
|---|---|---|---|---|---|---|---|
| Bed 3 | 211 | − | − | − | − | + | + |
|  | 212 | − | − | − | − | + | − |
|  | 219 | + | − | − | − | − | − |
|  | 225 | ∓[1] | + | − | + | − | − |
|  | 226 | ∓[1] | − | − | − | − | − |
|  | 229 | ∓[1] | + | − | − | − | − |
| Common | 237 | − | − | − | + | − | − |
|  | 238 | − | − | − | − | − | + |

[1] Valves may be open and closed as indicated at any time during step 1 depending on the amount of recycle desired.
+Means valve opened.
−Means valve closed.

Turning to FIGURE 4, we see a schematic of the one moving bed-type operation. The process is noncyclical, the adsorbent moves from the adsorption zone 301 to the desorption zone 302 and finally to the displacement zone 303. Feed consisting of solvent and solute is introduced into the bottom of zone 301 through line 306. Solvent passes up through zone 301 and exits through line 304. The solute and some solvent are adsorbed and passed into zone 302 on the adsorbent. As the adsorbent moves down zone 302, it comes in contact with a bulk phase which is richer in solute so that the solute displaces the solvent from the adsorbent. The material existing in line 307 is very high in solute concentration. A portion of the material in line 307 may be sent back to the desorption zone through line 310 to increase the solute concentration in line 307. This is analogous to reflux in distillation.

As the adsorbent passes from zone 302 to zone 303, it comes in contact with displacing gas which displaces the solute from the adsorbent and forms a barrier to the transfer of solute through zone 303. Almost all of the displacing gas is contained in zone 303. However, small amounts may escape either through line 304 or line 307 and this amount must be made up in line 308. The preferred point of introduction of line 308 into zone 303 is the point of maximum concentration of displacing agent in zone 303.

When the adsorbent approaches zone 301, it comes in contact with a solvent-rich stream which removes the displacing gas from the adsorbent. Thus, the solvent stream forms a barrier to the entrance of displacing gas into zone 301.

As with the solute, a portion of the solvent-rich stream may be recycled through line 305 to enhance the solvent concentration in line 304. The recycles are not critical but are desirable.

Multiple moving beds are also conceivable. These would allow more staging and effect even sharper separation. For example, the stream in line 304 could be fed through line 306 in a second moving bed to obtain an even purer solvent stream in line 304 from the second bed. The stream 307 could then be fed back to the first bed along with the feed through line 304 or at some other appropriate place in the bed where the bulk phase composition is similar to the stream in line 304.

EXAMPLE 1

In a specific embodiment of the invention, the absorbent utilized was a 10X molecular sieve. The bed was 4½ ft. deep. The displacing agent was ammonia and the feed was a hexane-benzene mixture containing 8% benzene. The process was carried out at a temperature of 650° F. and one atmosphere pressure.

TABLE IV

| | Adsorption 1 | | | Desorption 2 | | |
|---|---|---|---|---|---|---|
| | Hydrocarbon Flow Rate, w./w.-cycle | Average wt. Percent Benzene in Hydrocarbon | $NH_3$ Flow rate, w./w.-cycle | Hydrocarbon Flow Rate, w./w.-cycle | Average wt. Percent Benzene in Hydrocarbon | $NH_3$ Flow Rate, w./w.-cycle |
| Figure 1 Valve Number: | | | | | | |
| 3 | 0.156 | 8.0 | 0 | 0.071 | 8.0 | 0 |
| 10 | 0.156 | 0.44 | ~0 | 0 | | 0 |
| 12 | 0 | | 0 | 0.071 | 1.0 | 0 |
| 18 | 0 | | 0 | 0 | | 0 |
| 19 | 0 | | 0 | 0 | | 0 |
| 22 | 0 | | 0 | 0 | | 0 |
| 25 | 0 | | 0 | 0 | | 0 |

| | Desorption 1 | | | Desorption 2 | | |
|---|---|---|---|---|---|---|
| | Hydrocarbon Flow Rate, w./w.-cycle | Average wt. Percent Benzene in Hydrocarbon | $NH_3$ Flow rate, w./w.-cycle | Hydrocarbon Flow Rate, w./w.-cycle | Average wt. Percent Benzene in Hydrocarbon | $NH_3$ Flow Rate, w./w.-cycle |
| Figure 1 Valve Number: | | | | | | |
| 3 | 0 | | 0 | 0 | | 0 |
| 10 | 0 | | 0 | 0 | | 0 |
| 12 | 0 | | 0 | 0 | | 0 |
| 18 | 0 | | 0 | 0.071 | 1.0 | 0 |
| 19 | 0 | | 0 | 0.033 | 41.2 | 0.015 |
| 22 | 0.048 | 8.0 | ~0 | 0 | | 0 |
| 25 | 0.010 | 10.8 | 0.015 | 0 | | 0 |

Table IV indicates the conditions which were utilized with respect to flow rates and composition in a one fixed bed operation as shown in FIGURE 1. To simulate incomplete separation of the hexane and benzene from the $NH_3$ in the desorption 2 step, a small amount of hydrocarbon containing 10.8% benzene was added to the $NH_3$ in desorption step 1.

TABLE V

|  | Clnventional | New Cycle |
| --- | --- | --- |
| Rates, w./w./cycle: |  |  |
| Total Feed | 0.218 | 0.227 |
| Fresh Feed [1] | 0.190 | 0.189 |
| Recycle Desorbate [1] | 0.028 | 0.048 |
| Reject Desorbate [1] | 0.033 | 0.033 |
| Adsorption effluent [1] | 0.157 | 0.156 |
| $NH_3$ to Desorb | 0.0375 | 0.015 |
| Composition, Wt. Percent Aromatics: |  |  |
| Recycle Desorbate | 8.56 | 8.0 |
| Reject Desorbate | 45.7 | 41.2 |
| Adsorption effluent | [3] 0.09 | [2] 0.45 |
| Adsorption effluent yield with this recycle | 82.6 | 82.5 |

[1] Assumes complete removal of hydrocarbon from recycle $NH_3$ for conventional cycle.
[2] With hydrocarbon contamination in recylcle $HN_3$.
[3] Without hydrocarbon contamination in recycle $NH_3$.

Table V indicates the superior results which were obtained with the instant invention when compared with the earlier described conventional cycle.

What is claimed is:

1. An improved separation process which comprises:
    (a) introducing feed containing solvent and solute into an adsorption zone, said zone containing an adsorbent selective for the solute portion of said feed and containing adsorbed solvent, until a predetermined amount of solute appears in the adsorption effluent leaving said zone and collecting an effluent lean in solute at which time said flow is stopped;
    (b) adsorbing displacing agent within said zone countercurrent to the direction of flow of the feed thereby displacing the adsorbed solvent and solute, collecting said displaced solvent and solute, stopping the flow of displacing agent to said zone when a predetermined amount of displacing agent appears in the effluent stream, said predetermined amount of displacing agent being selected such that less than about 6% of the displacing agent fed to the bed is permitted to pass from the bed during this step;
    (c) adsorbing a portion of said adsorption effluent within said zone by passing said effluent in the same direction of flow as the displacing agent, thereby displacing the displacing agent and collecting displac-agent and a product enriched in solute; and
    (d) repeating steps (a), (b), and (c).

2. An improved separation process which comprises:
    (a) introducing a feed containing solvent and solute into a first adsorbent zone, said zone containing an adsorbent selective for the solute portion of said feed and containing adsorbed solvent and a minor amount of solute, until a predetermined amount of solute appears in the effluent leaving said bed and collecting an effluent lean in solute;
    (b) conveying at least a portion of said effluent from said first zone to a second adsorbent zone, the said second zone containing adsorbed displacing agent, said agent having previously been passed into said zone, in a direction opposite to that in which said feed was passed through the bed and in a manner such that less than about 6% of the agent fed to the zone was permitted to leave said zone during the feeding step;
    (c) adsorbing said effluent within said zone by passing effluent in the same direction as the said desorbing agent had previously been passed into the said zone thereby displacing said desorbing agent and solute-rich material;
    (d) separating said solute-rich material as product from said desorbing agent;
    (e) adsorbing said desorbing agent within said first adsorbent zone in a direction opposite to that in which said feed was passed through the bed and in a manner such that less than 6% of the total displacing agent fed to the said first zone is allowed to pass from the bed during the feeding step, thereby displacing the adsorbed solvent and solute;
    (f) switching the point of feed introduction from the first zone to the second zone and the point of introduction of displacing agent from the second zone to the first zone, and
    (g) repeating steps (a), (b), (c), (d), (e) and (f) cyclically.

3. The process of claim 2 wherein said feed comprises hydrocarbons containing molecules having as few as two carbon atoms and as many as thirty carbon atoms.

4. Th process according to claim 2 wherein said displacing agent has the general formula

wherein $R_1$, $R_2$ and $R_3$ are selected from the group consisting of hydrogen and $C_1$–$C_5$ alkyl radicals.

5. The process according to claim 2 wherein said displacing agent is ammonia.

6. The process according to claim 2 wherein said adsorbent is synthetic zeolitic material.

7. In a cyclic separation process wherein at least a portion of a hydrocarbon feed is selectively adsorbed in a fixed adsorption zone and the remainder of the feed passes out of the bed as effluent, the steps which comprise:
    (a) introducing a feed into an adsorption effluent-containing first adsorbent zone whereby at least a portion of the said adsorption effluent is displaced from the said bed;
    (b) halting the flow of said feed into said first zone when the desired amount of the said adsorbable portion of the feed has been adsorbed by said bed and whereby the said effluent contained in the bed is displaced;
    (c) conveying at least a portion of said effluent from the said first zone to a second adsorbent zone, the said second adsorbent zone containing a displacing agent which had been previously adsorbed within said second zone by passing said displacing agent in a direction opposite to that in which said feed was passed through the bed and in a manner such that less than about 6% of the agent fed to the zone was permitted to leave said zone during the feeding step;
    (d) adsorbing said effluent within said second zone by passing said efflent in the same direction as the said displacing agent was passed into said zone whereby at least a portion of the said displacing agent is displaced from said bed;
    (e) adsorping said displacing agent within said first adsorption zone by passing said displacing agent in a direction opposite to that in which said feed was passed through the bed and in a manner such that less than about 6% of the total displacing agent fed to the first zone is allowed to pass from the bed during the feeding step, whereby said adsorbed material is displaced;
    (f) switching the point of feed introduction from the first zone to the second zone and switching the point of introduction of displacing agent from the second zone to the first zone, and
    (g) cyclically repeating steps (a), (b), (c), (d), (e) and (f).

8. A process according to claim 7 wherein said adsorbent is a Type X molecular sieve.

9. A process according to claim 7 wherein said displacing agent has the general formula

wherein $R_1$, $R_2$ and $R_3$ are selected from the group consisting of hydrogen and $C_1$–$C_5$ alkyl radicals.

10. A process according to claim 7 wherein said displacing agent is ammonia.

11. A process according to claim 7 wherein said adsorbent is a synthetic zeolitic material.

12. In a cyclic separation process wherein at least a portion of a hydrocarbon feed is selectively adsorbed in an adsorbent zone and the remainder of the feed passed out of the zone as effluent, the steps which comprise:

(a) introducing a feed, at least a portion of which is adsorbable, into an adsorbent zone;

(b) recovering effluent from said adsorbent zone in two stages, a first segment which contains relatively less of said adsorbable portion and a second segment which contains relatively less of said adsorbable portion and a second segment which contains relatively more of said adsorbable portion;

(c) adsorbing displacing agent within said adsorbent zone by passing said displacing agent in a direction opposite to that in which said feed was passed through the bed and in a manner such that less than about 6% of the total displacing agent fed to the adsorption zone is permitted to pass from said zone during the feeding step, thereby displacing said adsorbed portion of said feed;

(d) adsorbing said second segment of effluent within said adsorbent bed by passing said second segment of effluent in the same direction as said displacing agent was passed thereby displacing said displacing agent, and (e) cyclically repeating steps (a), (b), (c) and (d).

13. The process of claim 12 wherein the said displacing agent has the general formula

wherein $R_1$, $R_2$ and $R_3$ are selected from the group consisting of hydrogen and $C_1$–$C_5$ alkyl radicals.

14. The process according to claim 12 wherein said displacing agent is ammonia.

15. A process according to claim 12 wherein said adsorbent is a Type X molecular sieve.

16. The process according to claim 12 wherein said adsorbent is a synthetic zeolitic material.

References Cited

UNITED STATES PATENTS

| | | | |
|---|---|---|---|
| 2,870,230 | 1/1959 | Scott et al. | 260—674 |
| 3,309,311 | 3/1967 | Epperly et al. | 208—310 |
| 2,646,451 | 7/1953 | Rommel | 260—674 |
| 2,899,379 | 8/1959 | Wilchinsty et al. | 208—310 |
| 2,963,519 | 12/1960 | Kasperik et al. | 208—310 |
| 2,966,531 | 12/1960 | Louis | 208—310 |

DELBERT E. GANTZ, Primary Examiner

C. E. SPRESSER, Assistant Examiner

U.S. Cl. X.R.

208—310; 260—676